Feb. 20, 1962
P. E. CAMPBELL
3,022,209
METHOD OF WELDING BUTTED PIPE SECTIONS OF
POLYETHYLENE TO FORM A REINFORCED JOINT
Filed Nov. 23, 1956
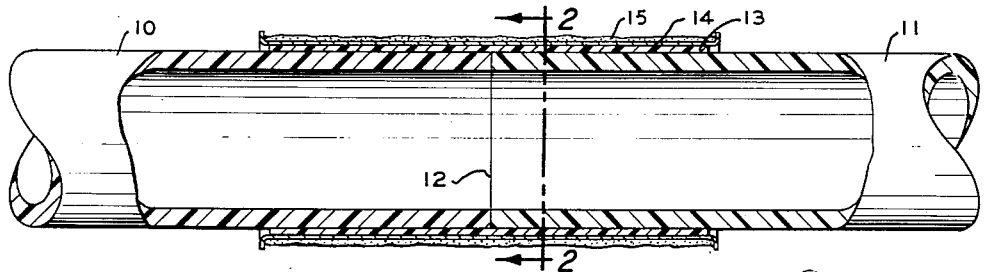
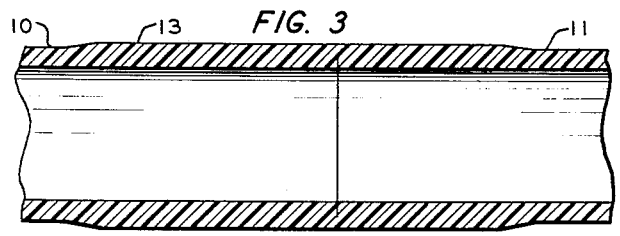
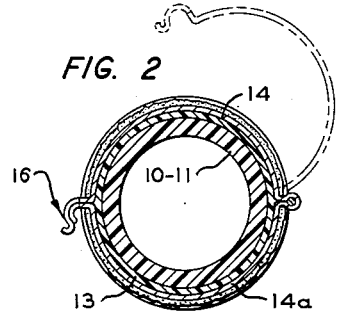
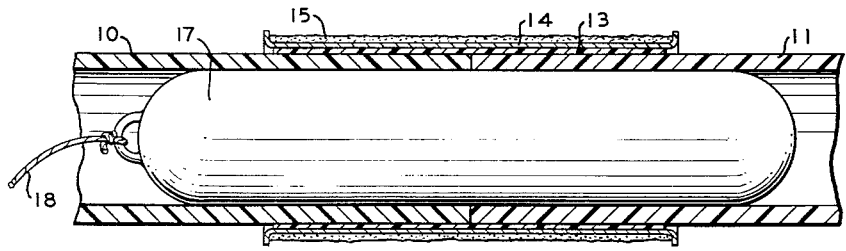
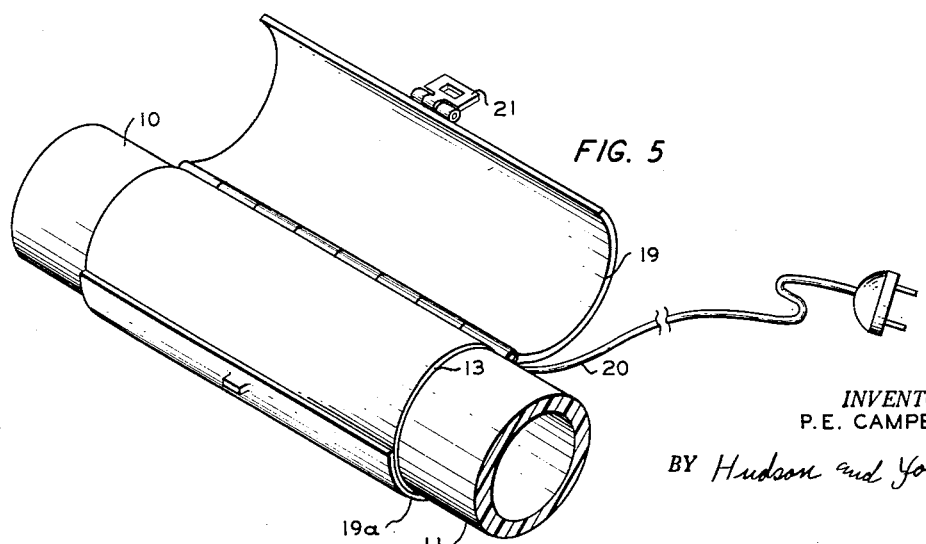
INVENTOR.
P. E. CAMPBELL
BY Hudson and Young
ATTORNEYS

United States Patent Office 3,022,209
Patented Feb. 20, 1962

3,022,209
METHOD OF WELDING BUTTED PIPE SECTIONS
OF POLYETHYLENE TO FORM A REINFORCED
JOINT
Paul E. Campbell, Bartlesville, Okla., assignor to Phillips
Petroleum Company, a corporation of Delaware
Filed Nov. 23, 1956, Ser. No. 623,976
4 Claims. (Cl. 156—158)

This invention relates to an improved method for welding high-melting polyethylene. In one aspect it relates to a method for welding ethylene polymers having molecular weight greater than 40,000, a crystallinity of 75 percent or higher, and a softening point of greater than 240° F. In another aspect the invention relates to an improved method for welding together joints of pipe made of high melting polyethylene.

The welding of articles of polyethylene has been carried out in the past in a variety of ways. One method which has been widely used is the employment of a flameless welding torch such as a torch which ejects a stream of hot air, and which is used in conjunction with a rod of suitable organic thermoplastic material, usually polyethylene. Another method which has been used to join sections of polyethylene pipe together comprises heating the ends of the joints by means of hot plates held close to the ends of the joints and thereafter pressing the softened polyethylene joints firmly together.

It has recently been discovered that 1-olefins having a maximum of 8 carbon atoms per molecule and no branching nearer the double bond than the 4-position can be polymerized to solid and semi-solid polymers at temperatures and pressures which are relatively low as compared to conventional processes for polymerizing such olefins. Such polymerization is generally carried out by first admixing and at least partially dissolving the olefins in a non-polymerizable solvent and by carrying out the polymerization in the presence of a catalyst. Such a process is disclosed in the copending application of Hogan and Banks, Serial No. 573,877, filed March 26, 1956, now Patent 2,825,721, issued March 4, 1958, for producing polymers of 1-olefins by carrying out the polymerization at a temperature in the range of 100 to 500° F. in the presence of 0.1 to 10 or more weight percent of chromium oxide, preferably including a substantial portion of hexavalent chromium associated with at least one porous oxide selected from the group consisting of silica, alumina, zirconia and thoria. A preferred catalyst is one comprising 0.1 to 10 or more weight percent chromium as chromium oxide supported upon a silica-alumina base such as 90 percent silica–10 percent alumina. The catalyst employed is usually a highly oxidized catalyst which has been activated by treatment at an elevated temperature under non-reducing conditions and preferably in an oxidizing atmosphere. Usually sufficient pressure is maintained in the reactor to insure that the desired amount of olefin is liquefied or dissolved in the solvent to provide the desired polymerization.

Polymerization usually is carried out in the liquid phase such as in solution in a hydrocarbon solvent, especially a paraffin or cycloparaffin which is liquid under the polymerization condition; however, vapor phase operation or mixed phase operation can be effected. Diolefins such as 1,3-butadiene are within the scope of this invention since any olefinic material having olefinic linkage in the 1-position, as described, comes within the scope of the invention of the above-identified copending application.

Although the welding methods hereinbefore described have been used in conjunction with the new polymers described in the copending application Serial No. 573,877, such welding methods have not been altogether satisfactory. It is therefore an object of this invention to provide an improved method for welding high melting point polyethylene articles. It is another object to provide a method for welding polyethylene which is applicable to polyethylene having a molecular weight greater than 40,000 and a softening point above 240° F. It is still another object of this invention to provide a simple and efficient device for welding high melting point polyethylene pipe joints together. Still another object of this invention is the provision of a method for welding together joints of pipe made from polyethylene where said polyethylene results from polymerization of ethylene in the presence of a chromium oxide catalyst associated with at least one porous oxide such as silica, alumina, zirconia and thoria at a temperature in the range of 100 to 500° F. Other and further objects and advantages of this invention will be apparent upon study of the dislosure including the drawings wherein FIGURE 1 illustrates one method for practicing the invention;

FIGURE 2 is a sectional view taken along lines 2—2 of FIGURE 1;

FIGURE 3 illustrates the results obtained by practice of the invention;

FIGURE 4 illustrates one modification of the invention illustrated in FIGURE 1; and FIGURE 5 illustrates another modification of the invention illustrated in FIGURE 1.

Broadly, the invention contemplates joining together the edges of two high-melting polyethylene articles by fusing a strip of the same high-melting polyethylene to the joint edges of the articles. This fusion is obtained by applying heat and pressure simultaneously to the strip which covers the joint edges of the articles. The method is particularly applicable to welding together joints of pipe made from polyethylene prepared by polymerization of ethylene at 100 to 500° F. in the presence of a catalyst comprising chromium oxide in association with at least one oxide selected from silica, alumina, zirconia, and thoria, as described in copending application Ser. No. 573,887. Certain of these polymers are characterized by a softening temperature above 240° F., crystallinity of about 90 percent or higher, and density above about 0.95.

The invention is also applicable to copolymers prepared from a major proportion of ethylene and a minor proportion of a higher 1-olefin such as propylene, 1-butene, 1-pentene, and the like. These copolymers are characterized by a lower melting point, lower percent of crystallinity, and lower density than the polyethylene prepared in a similar manner. The copolymers which are contemplated for use in the practice of this invention are also prepared by copolymerization in the presence of a catalyst comprising chromium oxide in association with at least one oxide selected from silica, alumina, zirconia, and thoria, as described in copending application Ser. No. 573,887. Certain of these polymers are characterized by a softening temperature above 240° F., crystallinity of about 75 percent or higher, and density above about 0.92.

The softening temperature as referred to in the specification and claims is defined as the temperature at which the polymeric material is softened sufficiently so that two pieces of the material can be fused together by the application of pressure. At this temperature it is necessary to apply sufficient pressure to the pieces to be joined so as to overcome what appears to be a surface tension phenomenon so that the two surfaces wet each other and become fused. The softening temperature of the polyethylene will be in the range of 240 to 600° F. and the pressure required to overcome surface tension will be in the range of 10 to 100 p.s.i.

The high crystallinity of the above-described polymers renders the resin subject to orientation. This is a particularly valuable property in many fabricated forms, including extruded pipe, wherein the direction of crystal orientation can be controlled during the extrusion step by drawing and/or blowing. The present method of welding high-melting polyethylene pipe joints together provides a means for effecting a strong joint at the junction of the pipes without raising the temperature of the entire pipe wall to the softening point and therefore the weld is accomplished with the minimum of deleterious effect to the crystal orientation in the pipe wall.

The low thermal conductivity of this high-melting polyethylene enables a welding strip of polyethylene and the outer surface of the pipe to be raised to fusion temperature and at the same time to maintain the temperature of the remainder of the pipe wall thickness at a temperature substantially below the softening or fusion temperature. The length of time required to accomplish the weld at a given temperature will be a function of the thickness of the welding strip applied to the joint to be welded. The welding strip should be between 0.04 and 0.75 the thickness of the pieces to be welded. A heating time of 1 to 10 minutes will ordinarily accomplish fusion of the welding strip and the surface of the pieces to be welded.

During the welding operation the ends of the pipe are forced together with a positive pressure so that a butt weld is obtained in that portion of the pipe wall which is raised to fusion temperature. Thus, the welded joint will have a homogeneous wall thickness substantially equal to or greater than the pipe wall thickness.

The invention may be more clearly understood by reference to the drawing wherein various modifications for practicing the invention are illustrated. The figures of the drawing are schematic in nature and are intended to illustrate, but not to limit the invention.

Referring now to FIGURE 1, joints of polyethylene pipes 10 and 11 are butted together at 12 to form a joint. A sleeve 13 of polyethylene encircles the joint. Clamping member 14, having a coating 15 of combustible material encircles the joint and polyethylene sleeve so as to press the sleeve upon the pipes 10 and 11. The clamping member can be composed of two halves hinged together as shown in FIGURE 2 and designated as 14 and 14a. The hinged halves are secured together by a latch 16 so that in closed position the sleeve 13 is pressed firmly against pipes 10 and 11 at a predetermined pressure. The ends of the clamping members can be turned down instead of up, as illustrated, if desired so as to prevent flow of fused material. Ordinarily this is not necessary because material which flows out will harden and prevent further flow.

FIGURE 3 shows the sleeve 13 fused to the pipes 10 and 11.

FIGURE 4 illustrates a modification of the invention shown in FIGURE 1 wherein a shaping plug 17 is inserted in pipes 10 and 11 to prevent distortion of the pipes at the joint. Shaping plug 17 can be coated with a "release" or "anti-sticking" agent such as powdered soapstone, silicone compounds, and the like to facilitate removal after the welding operation. The plug is preferably made of metal but can be constructed of fabric and rubber with means for inflating the plug during the welding operation. The plug is removed by means of line 18. An alternative procedure comprises substituting for the plug a sleeve of metal or high melting point plastic, such as nylon, polymerized tetrofluoroethylene sold under the trademark Teflon, and the like. This sleeve should provide a close fit on the inside of the pipe at the junction to be welded and provides a rigid support for the pipe so that heating under pressure can be continued until substantially all of the wall thickness of the pipe has been heated to the softening or fusion temperature resulting in a homogeneous pipe wall of greater thickness at the joint. This technique is particularly desirable in fabrication of pipe couplings where the pipe is to be subjected to considerable pressure or other severe conditions. The sleeve is left in the pipe after the weld has been completed.

FIGURE 5 illustrates a modification of the clamping member indicated 19 and 19a. In this modification an electrical heating element is incorporated in each half of clamping member 19 by conventional means, such as imbedding an insulated resistance wire in the clamping member. The heating element is connected to a source of potential by insulated conduit 20. The clamping member is secured in closed position by latch 21.

The clamping members 14 and 19 are constructed of a rigid, thermal conductive material such as a metal so as to apply uniform and positive pressure to the polyethylene strip which covers the junction of the pipes to be joined.

The combustible material which covers the outer surface of the clamping member of FIGURES 1, 2, and 4 can be compositions such as those used to vulcanize "hot patches" onto tire inner tubes. Combustible compositions such as these contain mixtures comprising potassium perchlorate, potassium chlorate, carbon, cellulose and sulfur in varying proportions.

The following example relates to the practice of one modification of this invention and the purpose of this example is to illustrate the operation of the process of this invention, but is not to be taken as limiting the invention.

Example I

Polyethylene was prepared by polymerization of ethylene at 280° F. and 400 to 500 p.s.i. utilizing cyclohexane as the diluent and the polymerization was conducted in the presence of a catalyst comprising chromium oxide in association with 90–10 silica-alumina. The catalyst was prepared by impregnating silica-alumina 90/10 with chromium trioxide solution followed by drying and activating the catalyst with dry air for about 6 hours at 960° F. The polyethylene was recovered from the cyclohexane diluent by cooling the reactor effluent, after catalyst removal in filtering the cyclohexane from the resulting precipitate of polymer. The polymer was fabricated into sheets of varying thicknesses.

Two pieces of the high-melting polymer described above, each having the approximate dimensions of 3 inches by 6 inches by $\frac{1}{16}$ inch, were butted together edgewise and a third piece of the same polymer having a thickness of 0.003 inch was laid over the joint. The heating section of a commercial automobile tire inner tube repair device was then clamped over the third piece of high-melting polymer and heat was applied through means of the electrical heating element in the tire repair device. The pressure applied to the polyethylene strip covering the junction of the two polyethylene pieces was about 60 p.s.i. and was maintained during the heating operation. After approximately 5 minutes at a temperature measured at 275° F. (±5° F.) the clamp was loosened and the two pieces of high-melting polymer were found to be strongly welded together.

Example II

Two lengths of high-melting polyethylene pipe extruded from polyethylene made according to the procedure of Example I, having an internal diameter of 1½ inches and an external diameter of 2 inches, are welded together in the following manner. The two ends of pipe are butted together within a sleeve comprising a length of polyethylene pipe of the same composition and having an internal diameter slightly greater than 2 inches so that a snug fit results and an external diameter of 2¼ inches. The sleeve is about 6 inches in length.

An aluminum sleeve comprising two hollow hemi-cylinders is clamped about the polyethylene sleeve so as to exert a pressure of about 40 p.s.i. upon the polyethylene sleeve. The aluminum sleeve is wrapped with a layer of asbestos ribbon and then is wrapped with resistance wire at about ½ inch spacing. The resistance wire is connected into an electrical circuit and sufficient current is applied to the circuit to raise the temperature of the polyethylene sleeve to about 275° F. and is maintained for about 10 minutes. After the sleeve has cooled to about 100° F. the aluminum clamp is removed and the weld is complete.

Reasonable variations and modifications are possible within the scope of the disclosure of the present invention, the essence of which is the discovery that two edges of high-melting polyethylene can be welded together by covering the joint with a sheet of the same polyethylene and heating it to a temperature above the softening point of the polyethylene for a time sufficient to raise the temperature of the sheet and a portion of the two edges to be joined to the desired temperature.

That which is claimed is:

1. A method for welding sections of pipe of ethylene polymers having a crystallinity of at least about 75 percent which comprises butting sections of said pipe together firmly to form a joint; encasing the joint in a sleeve consisting of ethylene polymers having a crystallinity of at least about 75 percent; applying heat at a temperature sufficient to soften said polymers and applying external pressure in the range of 10 to 100 p.s.i. to said joint to soften said sleeve and allowing said sleeve to cool before releasing the pressure.

2. A method for welding sections of pipe of ethylene polymers having a crystallinity of at least about 75 percent which comprises butting sections of said pipe together firmly to form a joint; inserting a shaping plug in said pipe sections and extending across said joint to prevent distortion of the pipes at the joint; encasing said joint in a sleeve consisting of ethylene polymers having a crystallinity of at least about 75 percent, said sleeve having a thickness between 0.04 and 0.75 the thickness of said sections; applying external pressure of 10 to 100 p.s.i. to said sleeve; heating said sleeve to a temperature sufficient to soften said polymers; allowing said sleeve to cool; releasing the pressure and withdrawing the plug.

3. A method for welding sections of pipe of polyethylene having a crystallinity of at least about 75 percent which comprises butting sections of said pipe together firmly to form a joint; encasing the joint in a sleeve consisting of polyethylene having a crystallinity of at least about 75 percent; applying heat at a temperature sufficient to soften said polyethylene and applying external pressure in the range of 10 to 100 p.s.i. to said joint to soften said sleeve and allowing said sleeve to cool before releasing the pressure.

4. A method for welding sections of pipe of polyethylene having a crystallinity of at least about 75 percent which comprises butting sections of said pipe together firmly to form a joint; inserting a shaping plug in said pipe sections and extending across said joint to prevent distortion of the pipes at the joint; encasing said joint in a sleeve consisting of polyethylene having a crystallinity of at least about 75 percent, said sleeve having a thickness between 0.04 and 0.75 the thickness of said sections; applying external pressure of 10 to 100 p.s.i. to said sleeve; heating said sleeve to a temperature sufficient to soften said polyethylene; allowing said sleeve to cool; releasing the pressure and withdrawing the plug.

References Cited in the file of this patent

UNITED STATES PATENTS

| | | |
|---|---|---|
| 1,290,041 | Anderson | Jan. 7, 1919 |
| 1,343,463 | Meredith | June 15, 1920 |
| 1,364,362 | Fetter | Jan. 4, 1921 |
| 2,340,926 | Bradley | Feb. 8, 1944 |
| 2,384,014 | Cutter | Sept. 4, 1945 |
| 2,535,171 | Sundstrom | Dec. 26, 1950 |
| 2,569,956 | Schiltknecht | Oct. 2, 1951 |
| 2,574,920 | Ilch | Nov. 13, 1951 |
| 2,667,865 | Herman | Feb. 2, 1954 |
| 2,670,313 | Young | Feb. 23, 1954 |
| 2,711,780 | Hakomaki | June 28, 1955 |
| 2,719,907 | Combs | Oct. 4, 1955 |
| 2,725,091 | Miner et al. | Nov. 29, 1955 |
| 2,738,826 | Clingman et al. | Mar. 20, 1956 |
| 2,739,829 | Pedlow et al. | Mar. 27, 1956 |
| 2,751,321 | Sans | June 19, 1956 |
| 2,766,518 | Constanzo | Oct. 16, 1956 |
| 2,783,174 | Stephens | Feb. 26, 1957 |

FOREIGN PATENTS

| | | |
|---|---|---|
| 1,133,731 | France | Nov. 19, 1956 |
| 585,186 | Great Britain | Jan. 31, 1947 |
| 652,054 | Great Britain | Apr. 18, 1951 |